US008527965B2

(12) United States Patent
Cifuentes et al.

(10) Patent No.: US 8,527,965 B2
(45) Date of Patent: Sep. 3, 2013

(54) LAYERED STATIC PROGRAM ANALYSIS FRAMEWORK FOR SOFTWARE TESTING

(75) Inventors: Cristina N. Cifuentes, Forest Lake (AU); Bernhard F. Scholz, Sydney (AU)

(73) Assignee: Oracle America, Inc., Redwood Shores, CA (US)

(*) Notice: Subject to any disclaimer, the term of this patent is extended or adjusted under 35 U.S.C. 154(b) by 1542 days.

(21) Appl. No.: 12/102,796

(22) Filed: Apr. 14, 2008

(65) Prior Publication Data

US 2009/0259989 A1 Oct. 15, 2009

(51) Int. Cl.
*G06F 9/44* (2006.01)

(52) U.S. Cl.
USPC ............... 717/131; 717/126; 717/124

(58) Field of Classification Search
USPC ......... 717/101–178; 714/100–824; 715/763, 715/805, 810; 711/132, 155
See application file for complete search history.

(56) References Cited

U.S. PATENT DOCUMENTS

| | | | | |
|---|---|---|---|---|
| 6,367,041 B1 * | 4/2002 | Statovici et al. | ............... | 714/724 |
| 6,823,507 B1 * | 11/2004 | Srinivasan et al. | ............ | 717/152 |
| 7,047,463 B1 * | 5/2006 | Organ et al. | ................. | 714/724 |
| 7,165,074 B2 * | 1/2007 | Avvari et al. | ................... | 717/124 |
| 7,168,009 B2 * | 1/2007 | Darringer et al. | ............ | 714/38.1 |
| 7,178,063 B1 * | 2/2007 | Smith | ........................... | 714/38.1 |
| 7,253,606 B2 * | 8/2007 | Loh et al. | ................. | 324/750.01 |
| 7,340,726 B1 * | 3/2008 | Chelf et al. | .................... | 717/126 |
| 7,562,255 B2 * | 7/2009 | El Far et al. | ............... | 714/38.14 |
| 7,571,390 B2 * | 8/2009 | Langkafel et al. | ............ | 715/763 |
| 7,788,640 B2 * | 8/2010 | Grimaldi | ....................... | 717/123 |
| 7,900,193 B1 * | 3/2011 | Kolawa et al. | ................ | 717/126 |
| 8,079,019 B2 * | 12/2011 | Lindo et al. | .................... | 717/129 |
| 8,230,401 B2 * | 7/2012 | Branca et al. | ................. | 717/135 |
| 2002/0166089 A1 * | 11/2002 | Noy | ............................. | 714/741 |
| 2003/0233635 A1 * | 12/2003 | Corrie | .......................... | 717/124 |
| 2004/0128584 A1 * | 7/2004 | Mandava et al. | ................ | 714/38 |
| 2004/0255277 A1 * | 12/2004 | Berg et al. | ...................... | 717/124 |
| 2005/0015752 A1 * | 1/2005 | Alpern et al. | ................. | 717/131 |
| 2005/0081104 A1 * | 4/2005 | Nikolik | ........................... | 714/38 |
| 2005/0081106 A1 * | 4/2005 | Chang et al. | ................... | 714/38 |

(Continued)

OTHER PUBLICATIONS

Beyer, D., Henzinger, T. A., Jhala, R., and Majumdar, R., Checking Memory Safety with Blast, Fundamental Approaches to Software Engineering (FASE), May 2005, Springer-Verlag, Berlin, 17 pages.

(Continued)

*Primary Examiner* — Lewis A Bullock, Jr.
*Assistant Examiner* — Francisco Aponte
(74) *Attorney, Agent, or Firm* — Osha Liang LLP (57) ABSTRACT

A method for analyzing a set of potential bug statements in source code. The method including obtaining a set of static program analyses; recursively reducing the set of potential bug statements in the source code by: selecting a static program analysis for each recursion from the set of static program analyses in order from least time consuming to most time consuming; evaluating the set of potential bug statements using the static program analysis of the set of static program analyses to determine a subgroup of bug free statements of the set of potential bug statements in each recursion; and removing the subgroup of the bug free statements from the set of potential bug statements to reduce the set of potential bug statements in each recursion; thereby filtering at least one subgroup of bug free statements out of the set of potential bug statements in the source code.

17 Claims, 6 Drawing Sheets

(56) References Cited

U.S. PATENT DOCUMENTS

| | | | |
|---|---|---|---|
| 2006/0080578 A1* | 4/2006 | Thiagarajan et al. | 714/38 |
| 2006/0085681 A1* | 4/2006 | Feldstein et al. | 714/25 |
| 2006/0150160 A1* | 7/2006 | Taft et al. | 717/126 |
| 2006/0225056 A1* | 10/2006 | Mukkavilli | 717/141 |
| 2006/0248519 A1* | 11/2006 | Jaeger et al. | 717/141 |
| 2006/0253739 A1* | 11/2006 | Godefroid et al. | 714/38 |
| 2006/0253841 A1* | 11/2006 | Rioux | 717/127 |
| 2007/0006194 A1* | 1/2007 | Mejri et al. | 717/151 |
| 2007/0028220 A1* | 2/2007 | Miller et al. | 717/124 |
| 2007/0061781 A1* | 3/2007 | Bryan | 717/124 |
| 2007/0234300 A1* | 10/2007 | Leake et al. | 717/124 |
| 2007/0234305 A1* | 10/2007 | Mishra et al. | 717/128 |
| 2008/0222609 A1* | 9/2008 | Barry et al. | 717/124 |
| 2008/0244536 A1* | 10/2008 | Farchi et al. | 717/130 |
| 2008/0256392 A1* | 10/2008 | Garland et al. | 714/33 |
| 2008/0270992 A1* | 10/2008 | Georgieva et al. | 717/127 |
| 2008/0276228 A1* | 11/2008 | Sreedhar | 717/131 |
| 2009/0044177 A1* | 2/2009 | Bates et al. | 717/131 |
| 2009/0070643 A1* | 3/2009 | Anvekar et al. | 714/718 |
| 2009/0125887 A1* | 5/2009 | Kahlon et al. | 717/126 |
| 2009/0259989 A1* | 10/2009 | Cifuentes et al. | 717/110 |
| 2009/0307664 A1* | 12/2009 | Huuck et al. | 717/124 |

OTHER PUBLICATIONS

Le, W. and Soffa, M. L., Refining Buffer Overflow Detection via Demand-Driven Path-Sensitive Analysis, Program Analysis for Software Tools & Engineering, Jun. 13-14, 2007, San Diego, California, 6 pages.

* cited by examiner

```
0   #include <stdlib.h>
1   #define BUFF_SIZE 100
2   
3   int main (int argc, char *argv[])
4   {
5       char buf[BUFF_SIZE], *buf2;
6       int n = BUFF_SIZE, i;
7   
8       if (argc != 3){
9           printf("Usage: prog_name length_of_data data\n");
10          exit(-1);
11      }
12  
13      for (i = 1; i <= n; i++) {
14          buf[i] = 'A';
15      }
16      buf[n] = '\0';
17  
18      n = atoi(argv[1]);
19      buf2 = (char*)malloc(n);
20      for (i = 0; i <= n; i++) {
21          buf2[i] = argv[2][i];
22      }
23  
24      return 0;
25  }
```

Sample Code 400

FIGURE 4A

Sample Code 410 →

```
4      char buf[100];
       ...
15     buf[100] = '\0';
       ...
```

FIGURE 4B

Sample Pseudo-Code 420 →

```
11     int i;
12     for (i = 1; i <= 100; i++) {
              if (i < 0 || i > 99)
                     return (true);
14     }
       return (false);
```

FIGURE 4C

Sample Code 430 →

```
3      int main (int argc, char *argv[])
       ...
16     char *buf2;
17     n = atoi(argv[1]);
18     buf2 = (char*)malloc(n);
19     for (i = 0; i <= n; i++) {
20            buf2[i] = argv[2][i];
21     }
```

LAYERED STATIC PROGRAM ANALYSIS FRAMEWORK FOR SOFTWARE TESTING

BACKGROUND OF INVENTION

Software bugs are errors, flaws, mistakes, or faults in computer programs that prevent it the program from behaving as intended and/or producing an incorrect result. Software testing, i.e. bug checking is a process used to assess and improve the qualities of computer software by identifying bugs in the implementation of the code (e.g., source code, object code, binary/executable code, etc.) so that they may be removed. The qualities of computer software may include the correctness, completeness, security, capability, reliability, efficiency, portability, maintainability, compatibility, usability and any other suitable characteristic.

Software testing which involves manually inspecting code may be tedious and repetitive as most software systems are in the order of thousands to millions of lines of code. Accordingly, dynamic and static program analyses methods have been developed to test software code.

Dynamic software testing, i.e., dynamic program analysis involves the analysis of executable code, i.e., during execution of the software to identify errors within the code. Static software testing, i.e., static program analysis involves the testing of non-executable code, i.e., not during execution of the software, to identify errors within the code and is usually performed on some version of the source code or object code.

Static program analysis of software code allows for classification of a portion or all of the statements within the software code as bug free statements or actual bug statements. Classification of the software code improves the efficiency of manual code inspection as a software tester is able to selectively inspect and/or modify the software code based on the classification.

SUMMARY OF INVENTION

In general, in one aspect, the invention relates to a method for analyzing a plurality of potential bug statements in source code. The method includes obtaining a plurality of static program analyses; recursively reducing the plurality of potential bug statements in the source code by: selecting a static program analysis for each recursion from a plurality of static program analyses in order from least time consuming to most time consuming; evaluating the plurality of potential bug statements using the static program analysis of the plurality of static program analyses to determine a subgroup of bug free statements of the plurality of potential bug statements in each recursion; and removing the subgroup of the bug free statements from the plurality of potential bug statements to reduce the plurality of potential bug statements in each recursion; thereby filtering at least one subgroup of bug free statements out of the plurality of potential bug statements in the source code.

In general, in one aspect, the invention relates to a system for analyzing a plurality of potential bug statements. The system includes a results repository comprising: a plurality of potential bug statements; a static analysis engine comprising functionality to recursively: select a static program analysis for each recursion from a plurality of static program analyses in order from least time consuming to most time consuming; evaluate the plurality of potential bug statements using the static program analysis of the plurality of static program analyses to determine a subgroup of bug free statements of the plurality of potential bug statements in each recursion; and remove the subgroup of the bug free statements from the plurality of potential bug statements to reduce the plurality of potential bug statements in each recursion; a statement modifier comprising functionality to: modify at least one potential bug statement of the plurality of potential bug statements.

In general, in one aspect, the invention relates to a computer readable medium comprising instructions for analyzing a plurality of potential bug statements. The instructions comprising functionality for obtaining a plurality of static program analyses; recursively reducing the plurality of potential bug statements in the source code by: selecting a static program analysis for each recursion from a plurality of static program analyses in order from least time consuming to most time consuming; evaluating the plurality of potential bug statements using the static program analysis of the plurality of static program analyses to determine a subgroup of bug free statements of the plurality of potential bug statements in each recursion; and removing the subgroup of the bug free statements from the plurality of potential bug statements to reduce the plurality of potential bug statements in each recursion; thereby filtering at least one subgroup of bug free statements out of the plurality of potential bug statements in the source code.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method for analyzing potential bug statements in software code. Specifically, embodiments of the invention provide a method and system for recursively reducing potential bug statements in the software code using multiple static program analyses from least time consuming to most consuming.

Figure 1:
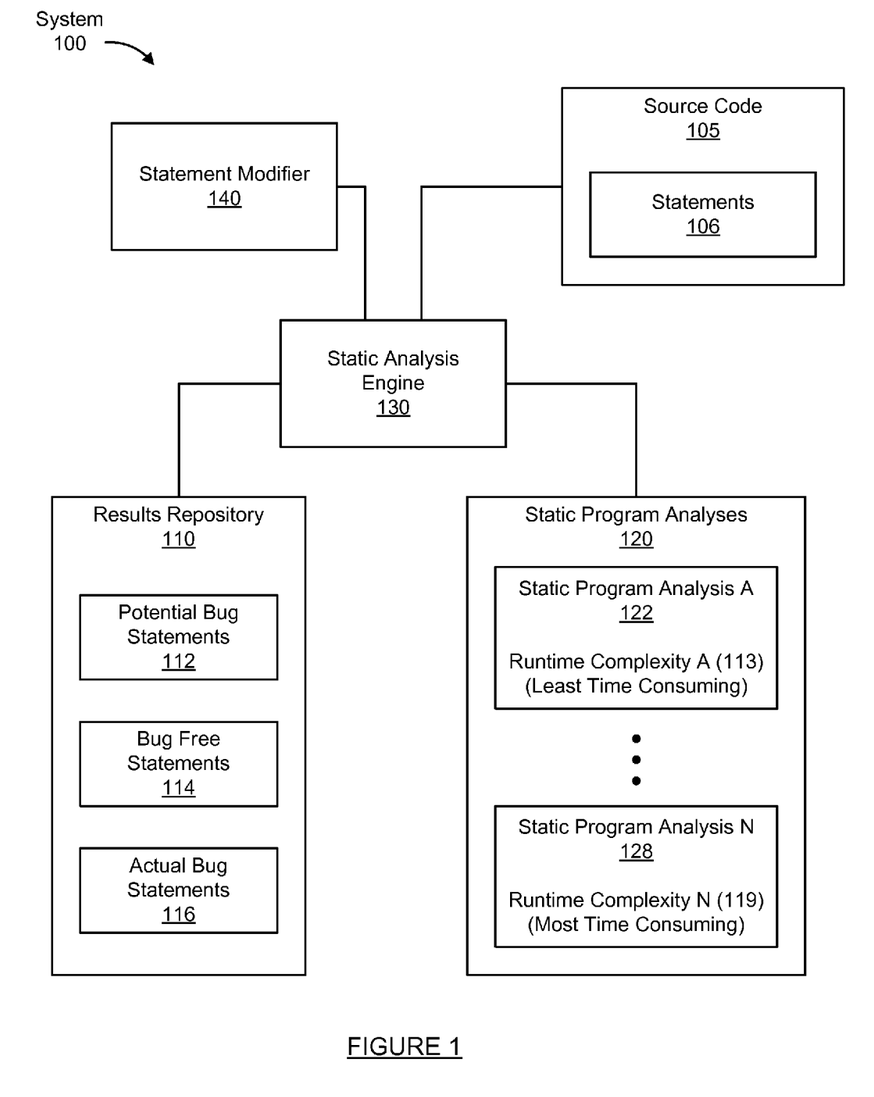
FIG. 1 shows a system in accordance with one or more embodiments of the invention.

FIG. 1 shows a system (100) in accordance with one or more embodiments of the invention. As shown in FIG. 1, the system (100) includes source code (105), a results repository (110), static program analyses (120), a static analysis engine (130), and a statement modifier (140). Each of these components are described below and may be located on the same device (e.g., a server, mainframe, desktop personal computer (PC), laptop, personal desktop assistant (PDA), television, cable box, satellite box, kiosk, telephone, mobile phone, or other computing devices) or may be located on separate devices coupled by a network (e.g., Internet, Intranet, Extranet, Local Area Network (LAN), Wide Area Network (WAN), or other network communication methods), with wire and/or wireless segments in a manner shown and described in relation to FIG. 5 below.

In one or more embodiments of the invention, the system (100) is implemented using a client-server topology. The system (100) itself may correspond to an enterprise application running on one or more servers, and in some embodiments could be a peer-to-peer system, or resident upon a single computing system. In addition, the system (100) is accessible from other machines using one or more interfaces (not shown). In one or more embodiments of the invention, the system (100) is accessible over a network connection (not shown), such as the Internet, by one or more users. Information and/or services provided by the system (100) may also be stored and accessed over the network connection.

In one or more embodiments of the invention, the source code (105) corresponds to software code including, but not limited to, code in a high level programming language, low level programming language, and/or machine language, intermediate representations generated by a compiler, executable code, graphical representations of code (e.g., diagrams representing code), or any other form of code. Statements (106) within the source code (105) correspond to simple statements, compound statements, declarations, or any other component of the source code (105). Statements (106) may be separated using statement separators and/or statement terminators defined in the programming language. Further, statements (106) within the source code (105) may include bugs or may be free of bugs.

In one or more embodiments of the invention, the results repository (110) corresponds to a data storage device that includes functionality to store source code. The results repository may include the source code (105) itself or a copy of the source code (105) where statements (106) within the source code (105) are classified as potential bug statements (112), bug free statements (114) and/or actual bug statements (116). In one or more embodiments of the invention, where statements (106) that are classified as potential bug statements (112), bug free statements (114), and/or actual bug statements (116) are actually stored in the results repository (110), access to the results repository (110) may be restricted and/or secured. As such, access to the results repository (110) may require authentication using passwords, secret questions, personal identification numbers (PINs), biometrics, and/or any other suitable authentication mechanism. Those skilled in the art will appreciate that elements or various portions of data stored in the results repository (110) may be distributed and stored in multiple data repositories. In one or more embodiments of the invention, the results repository (110) is flat, hierarchical, network based, relational, dimensional, object modeled, or structured otherwise. For example, the results repository may be maintained as a table of a SQL database. In addition, data in the results repository (110) may be verified against data stored in other repositories.

In one or more embodiments of the invention, a potential bug statement (112) may correspond to any statement (106) of the source code (105) which has not been classified as a bug free statement (114) or an actual bug statement (116) (e.g., by a static program analysis or by a user). In one or more embodiments of the invention, a portion or all of the statements (106) in the source code (105) may initially be classified as potential bug statements (112), until the potential bug statements (112) are re-classified as (e.g., deduced to be) bug free statements (114) or actual bug statements (116).

In one or more embodiments of the invention, a bug free statement (114) is a statement without any errors. A bug free statement (114) may also correspond to a statement that has been identified as not having a particular type of error. An example of a bug free statement is a statement that assigns a constant numerical value to a newly declared integer variable.

In one or more embodiments of the invention, an actual bug statement (116) is a statement that has been identified as containing an error. The actual bug statement (116) may be identified as having a specified error, a type of error, or the specific error itself. Furthermore, an actual bug statement (116) may be stored/identified together or separately from the potential bug statements (112). An example of an actual bug statement is a statement(s) that uses a numerical value entered by a user as an address in memory. In this example, data at an unknown memory address may be accessed for execution. Another example involves a buffer overflow, where an index value for referencing an array may be out of bounds based on input.

Continuing with FIG. 1, in one or more embodiments of the invention, the static program analyses (120) correspond to a process, program, and or system to evaluate whether a potential bug statement (112) is a bug free statement (114) or an actual bug statement (116). The static program analyses (120) may check for one or more specific errors in potential bug statements (112), discussed above, or general qualities of the code. Further, the static program analyses (120) may include, but are not limited to, data flow analysis, type analysis, abstract interpretation (i.e., symbolic analysis), and model checking.

In one or more embodiments of the invention, each of the static program analyses (120) are associated with an expected time consumption for execution. The expected time consumption may be a runtime complexity estimate (e.g., linear, exponential, logarithmic, or other suitable estimate). Further, the expected time consumption may be general or code specific. For example, an expected time consumption for execution of a static program analysis (e.g., static program analysis A (122) and static program analysis N (128)) may be based on the type of software (e.g., an operating system, a word processing application, a game). Alternatively, the expected time consumption may be based on a particular software application. Historical data for a previous execution of a static program analysis on the software application (i.e., a different version of the software application or same version of the software application) may be used to determine an estimated time consumption for execution of the static program analysis on the software application.

In one or more embodiments of the invention, the static analysis engine (130) includes functionality to identify a set of potential bug statements (112) within the code for a software application. The static analysis engine (130) may simply identify the entire source code (105) as potential bug statements (112) or may select a subgroup of statements (106) from the source code (105). For example, the static analysis engine may perform a taint analysis to identify statements affected by user input as the set of potential bug statements. The static analysis engine (130) may also identify statements (106) within the source code (105) that may cause one or more specific error types. For example, the static analysis engine may identify all statements that are related to array indexing, to check for buffer overflow errors, as potential bug statements.

In one or more embodiments of the invention, the static analysis engine (130) may recursively evaluate the identified potential bug statements (112) using one or more static program analyses (120) to determine if the potential bug statements (112) are bug free statements (114) or actual bug statements (116). The static analysis engine (130) includes functionality to identify the least time consuming static program analysis based on the estimated time consumption of each of the static program analyses. Furthermore, the static analysis engine (130) may include functionality to remove bug free statements (114) and/or actual bug statements (116) from the potential bug statements (112) based on evaluating the potential bug statements (112) using the static program analyses (120).

In one or more embodiments of the invention, the statement modifier (140) corresponds to a program (e.g., a text editor) and/or system to modify statements (106) within the source code (105). The statement modifier (140) may be used to modify potential bug statements (112) and/or actual bug statements (116), identified by the static analysis engine (130), within the source code (105). The statement modifier (140) may also include functionality to add and delete statements (106) to and from the source code (105).

In one or more embodiments of the invention, the system (100) may be accessed using a user interface (not shown). The user interface may be a web interface, a graphical user interface (GUI), a command line interface, an application interface or any other suitable interface. The interface may also include one or more web pages that can be accessed from a computer with a web browser and/or internet connection. Alternatively, the interface may be an application that resides on a computing system, such as a PC, mobile devices, a PDA, and/or other computing devices of the users, and that communicate with the system (100) via one or more network connections and protocols.

Figure 2:
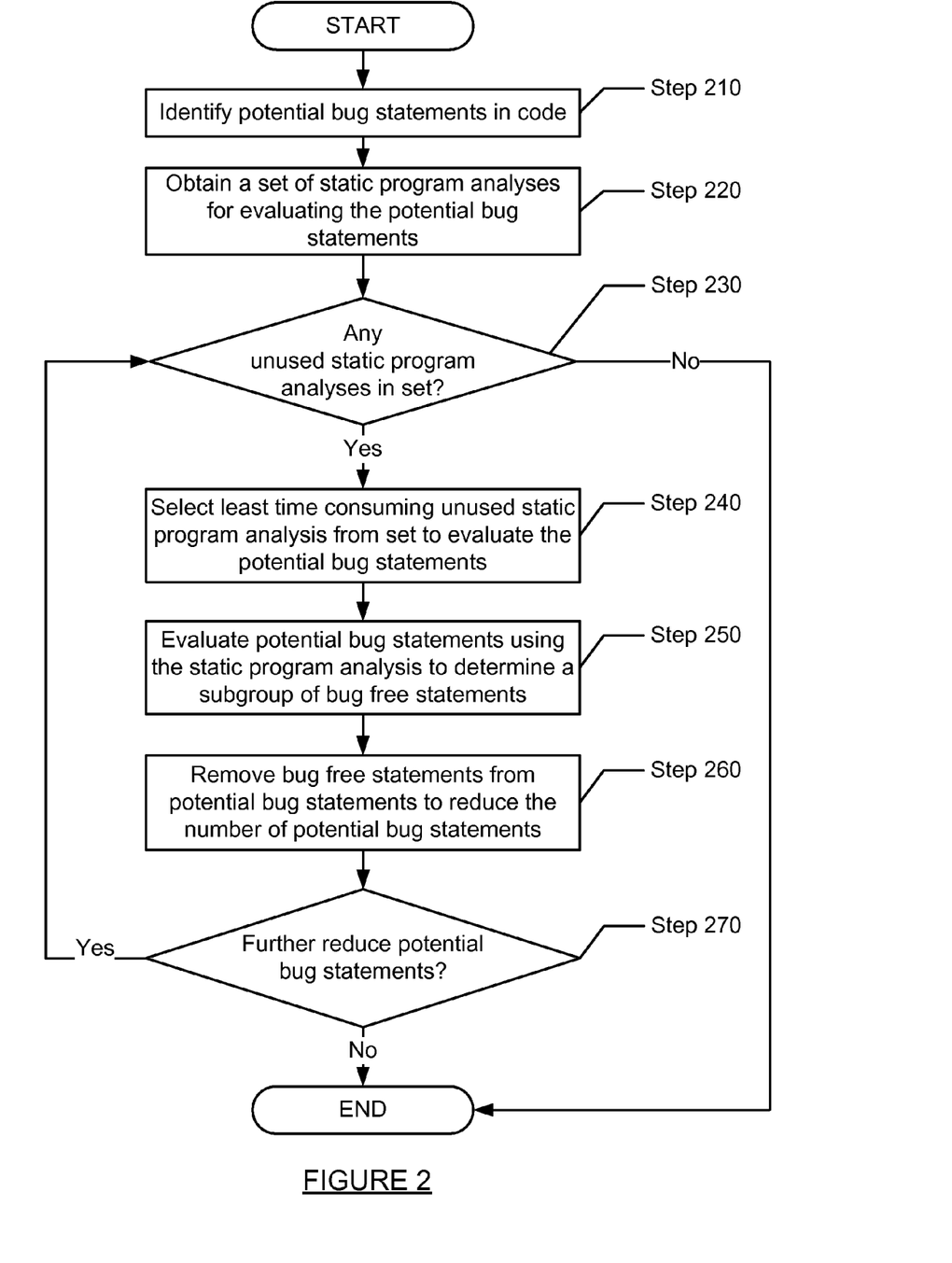
FIGS. 2 and 3 show flow charts in accordance with one or more embodiments of the invention.

FIG. 2 shows a flow chart in accordance with one or more embodiments of the invention. In one or more embodiments of the invention, one or more of the steps described below may be omitted, repeated, and/or performed in a different order. Accordingly, the specific arrangement of steps shown in FIG. 2 should not be construed as limiting the scope of the invention.

Specifically, FIG. 2 shows a flow chart for analyzing code. Initially, potential bug statements within the code are identified (Step 210). In a simple embodiment of the invention, all statements in code may be identified as potential bug statements. In another embodiment of the invention, the potential bug statements may be identified by searching for specific patterns, characters, keywords, and/or other suitable characteristics found within the code. For example, when searching for assignments in a programming language that represents assignments with a '=', all statements with the '=' character may be identified as potential bug statements. Another example may involve taint analysis, where the code is traversed from each point at which user input is collected, to identify all code that may be affected by the user input as potential bug statements. In another example, the identified potential bug statements may involve a keyword search of all statements including global variables. Further, a subgroup of statements related to a particular type of potential bug (e.g., array indexing statements related to buffer overflow) may be identified as the set of potential bug statements. In one or more embodiments of the invention, the potential bug statements may be identified based on the results of a previous static program analysis. For example, if the static program analysis of statements within a function results in a large number of actual bug statements, then additional statements or a greater percentage of statements within the function may be analyzed, i.e., identified as potential bug statements.

In one or more embodiments of the invention, a set of static program analyses is obtained for evaluation of the potential bug statements (Step 220). Obtaining the set of static program analyses may involve selecting the static program analyses from a larger pool of available static program analyses. For example, based on the code, the type of software application, historical data associated with the software application (e.g., prior evaluation results), or other suitable criteria, a set of static program analyses may be selected for evaluating the potential bug statements. In another embodiment of the invention, the static program analyses may be dynamically selected. For example, a static program analysis for evaluation of the remaining potential bug statements may be selected based on the result of a previous evaluation (see Step 250 discussed below).

Continuing with FIG. 2, in one or more embodiments of the invention, in Step 230, a determination is made whether there are any used static program analyses available for evaluating the potential bug statements. If there are unused static program analyses, the least time consuming unused static program analysis is selected (Step 240). For example, if each of the unused static program analyses are associated with the an estimated runtime (e.g., linear, quadratic, exponential based on lines of code or other criteria), the unused static program analysis with the lowest runtime estimate (i.e., linear from exemplary set of linear, quadratic, and exponential) would be selected. In another embodiment of the invention, a portion of the code may be evaluated using each of the unused static program analyses. Thereafter, the static program analysis with the lowest runtime for the portion of code may be selected for evaluating the remaining potential bug statements.

In one or more embodiments of the invention, the potential bug statements are evaluated using the selected static program analysis to determine a subgroup of bug free statements (Step 250). For example, the potential bug statements may be parsed and checked for specific errors (e.g., buffer overflows, double frees, etc.), and if the specific errors are not found the potential bug statements may be deemed as bug free statements. An example involves a static program analysis directed at model checking that checks the structure of a software module for a logical formula. In this example, code may be translated to a finite state machine, where each node in the finite state machine is defined by a set of values (e.g., global variables, stacks, and heaps). The code may then be tested if it is possible to reach a set of values that does not match one of the nodes in the finite state machine. If such a set of values exist, the potential bug statements are not bug free statements. Accordingly, they may be deemed as actual bug statements and may remain classified as potential bug statements or may be removed from the set of potential bug statements and reclassified as actual bug statements. If such a set of values does not exist, then the statements may be deemed as bug free statements.

Once a set of bug free statements are identified based on the evaluation of the potential bug statements, the bug free statements may be removed (Step 260) if they do not need to be tested for other bugs or using other static program analyses. The removed statements may be stored separately or simply deleted from the potential bug statements. In addition, the set of actual bug statements may also be filtered out for modification by a user (not shown).

In one or more embodiments of the invention, a determination is made whether the remaining potential bug statements after filtering out the bug free statements need to be further reduced (Step 270). The determination may be based on whether the potential bug statements have been reduced to a certain predetermined number of potential bug statements. In another embodiment of the invention, the decision to further reduce the potential bug statements may be based on the number of actual bugs found. For example, if a high number of actual bugs are found, the potential bug statements may all need to be reviewed and accordingly, not further reduced. Alternatively, if a very low number of potential bug statements are found, it is less likely that a large number of errors still exist in the remaining potential bug statements. Accordingly, if needed the remaining potential bug statements may be further reduced by another recursion (Steps 230-Step 260). Thereby, one or more embodiments of the invention allow for reduction of the statements within the source code that are classified as potential bug statements. Filtering out bug free statements reduces the total number of potential bug statements that need to be manually inspected by a programmer or other user to check for errors. Furthermore, identifying actual bug statements from the potential bug statements alerts a user for correction of the source code.

In one or more embodiments of the invention, one or more of the steps shown in FIG. 2 (i.e., Steps 210-270) may be repeated for different specified errors. For example, Steps 210-270 may be first completed to check for buffer overflows resulting in a first set of bug free statements, potential bug statements, and actual bug statements. Thereafter, Steps 210-270 may again be completed to check for double frees resulting in a second set of bug free statements, potential bug statements, and actual bug statements.

Figure 3:
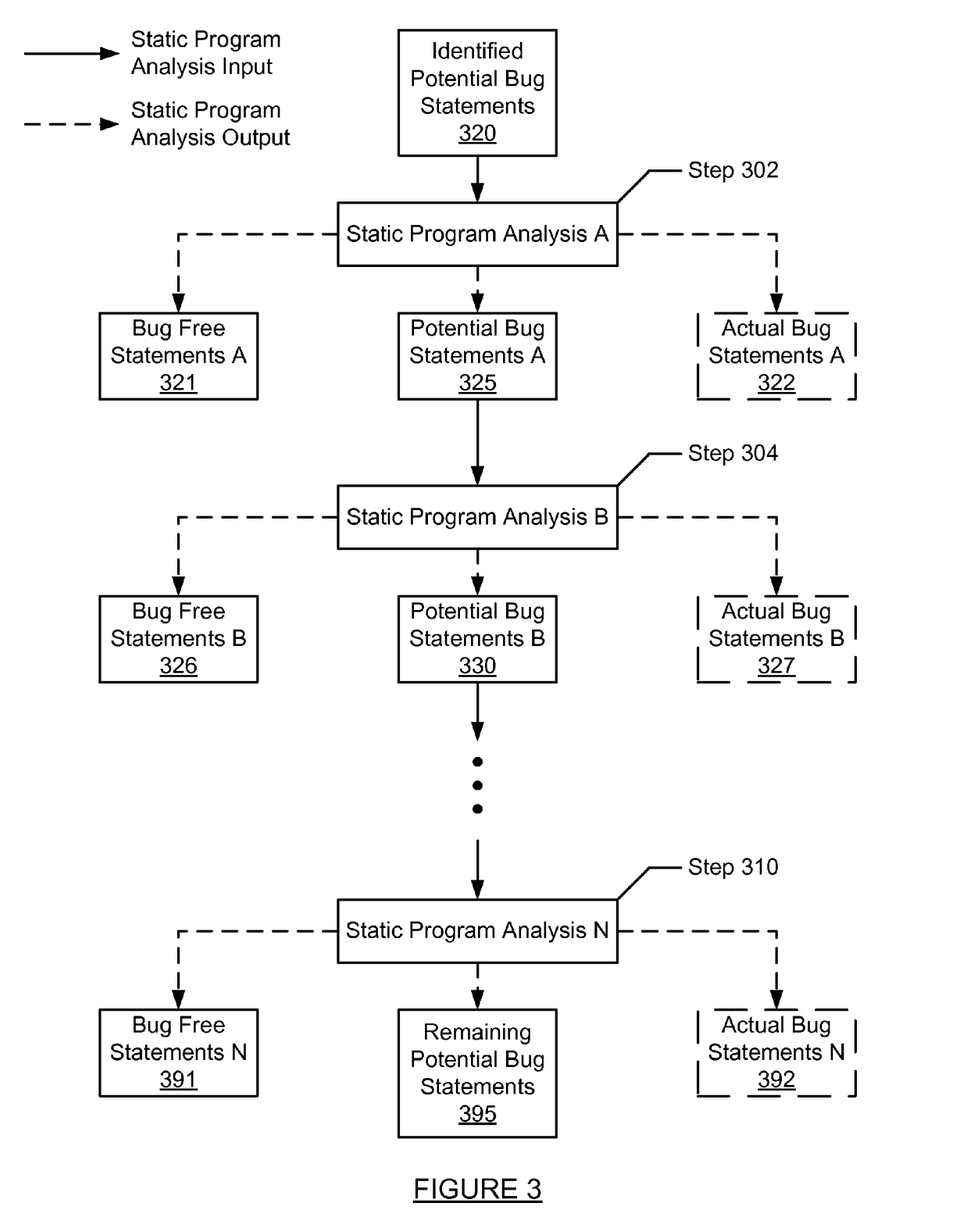

FIG. 3 shows a diagram, in accordance with one or more embodiments of the invention, in which different static program analyses may be concurrently executed. Initially in Step 302, the static program analysis A is executed using the identified potential bug statements (320) as input to determine whether the identified potential bug statements (320) are bug free statements A (321), and/or actual bug statements A (322). The identified potential bug statements (320) that are not determined to be bug free statements A (321) may remain classified as potential bug statements (i.e., potential bug statements A (325)). The input may be provided continuously and/or periodically. For example, the identified potential bug statements may be provided in sets (e.g., a set of statements that contain a predetermined type of potential bug or a set of statements within a function/block of code), as a continuous stream of statements for analysis, and/or in any other suitable manner. Accordingly, the output of the static program analysis A (bug free statements A (321), potential bug statements A (325), and actual bug statements A (322)) may be obtained in sets, as a continuous stream of statements, and/or in another suitable manner.

In one or more embodiments of the invention, Step 304, which may be executed concurrently with Step 302, the static program analysis B is executed using the potential bug statements A (325) as input to determine whether the potential bug statements A (325) are bug free statements B (326), potential bug statements B (330), and/or actual bug statements B (327). Accordingly, a portion of the output of static program analysis A from Step 302 is used as input for static program analysis B in Step 304. Similar to static program analysis A, static program analysis B results in a continuous and/or periodic flow of input statements and output statements.

In one or more embodiments of the invention, any number of static program analyses may be executed concurrently using the output of the previous static program analysis as input. After the final static program analysis has been executed (Step 310), the remaining potential bug statements (395) may be reviewed manually for errors. In one or more embodiments of the invention, the remaining potential bug statements (395) are fewer than the initially identified potential bug statements (320). Accordingly, embodiments of the invention may allow for a reduction of the number of potential bug statements that need to be manually reviewed for finding errors. Further, embodiments of the invention may allow for finding actual bug statements in a continuous and/or periodic manner for correction. Furthermore, embodiments of the invention may allow for the concurrent analysis of different portions of the code.

Figure 4A:
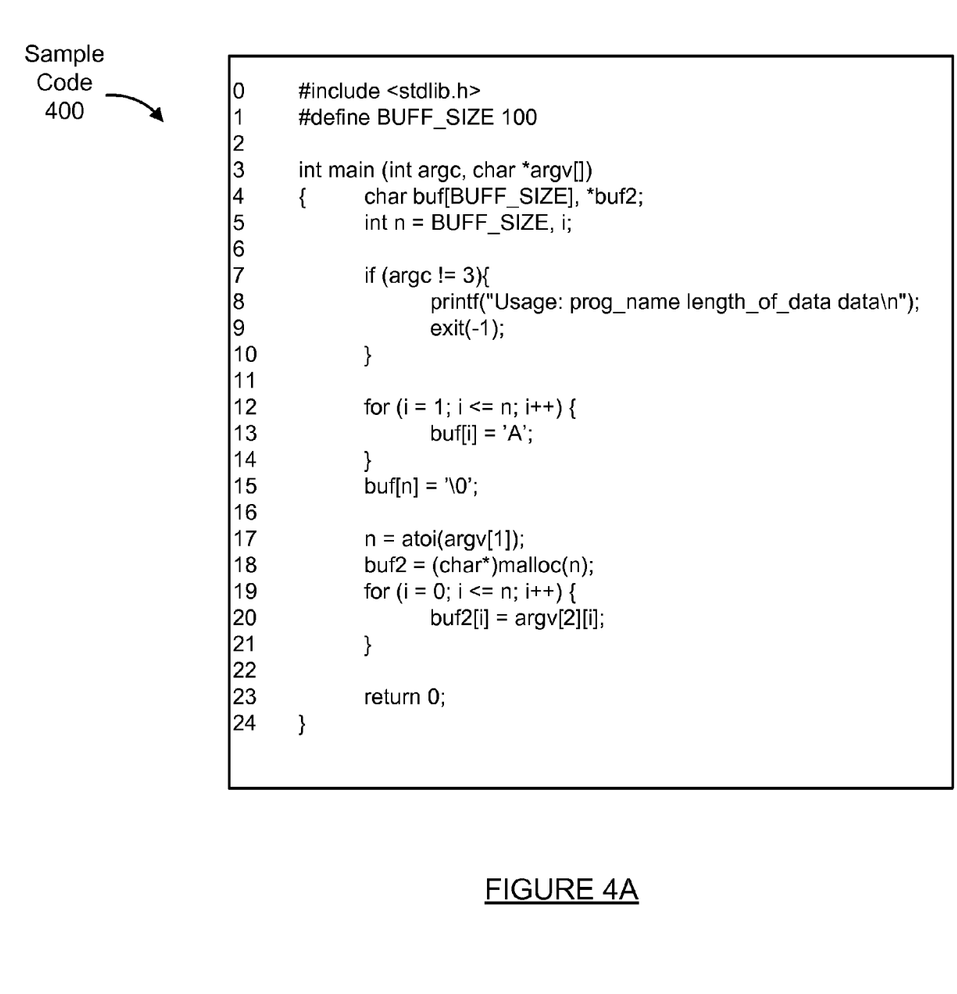
FIGS. 4A-4D show sample code segments for describing static program analysis in accordance with one or more embodiments of the invention.

FIG. 4 shows a code sample (400), with four errors, for analysis using static program analysis. The program shown in the code sample (400) takes arguments of the length of some data and the data itself (as strings). The program initializes two buffers: the stack buffer "buf" is initialized to the "AAA...A" string with a trailing C end-of-string character, and the heap buffer "buf2" is initialized to the input data provided as the second parameter, after allocating data from a first parameter sized heap. The errors in the code sample are as follows:

A) The index computed in line 12 is out of bounds for the last iteration of the loop, causing a stack buffer overflow on line 13.
B) The terminating string character in line 15 is assigned to the wrong index location, causing a stack buffer overflow.
C) The ASCII-to-integer translation in line 17 converts a signed integer into an unsigned integer of equal size. If a negative value is input as parameter to this function, a very large positive number will be stored in variable n, leading to the wrong heap buffer allocation on line 18.
D) The index computed in line 19 is out of bounds on the last iteration of the loop, causing an off-by-one heap buffer overflow on line 20.

Figure 4B:
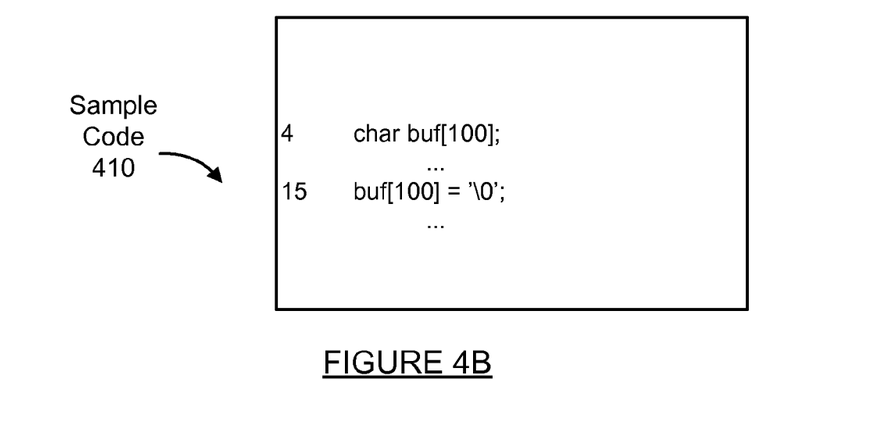

In this example, in order to check for buffer overflows (i.e., three of the above four errors) a static program analysis is first used to analyze the sample code based on constant propagation and check on any write array accesses where the index is constant, to determine if it is out of bounds. In the example, variable n, initialized in line 5 with a constant value, can be constant folded into its uses at lines 12 and 15, leading to the snippet of code, shown in FIG. 4B. The constant array access on line 15 can be checked to be out of bounds as the array "buf" was defined in line 4 to have 100 elements indexed from 0 to 99.

Figure 4C:
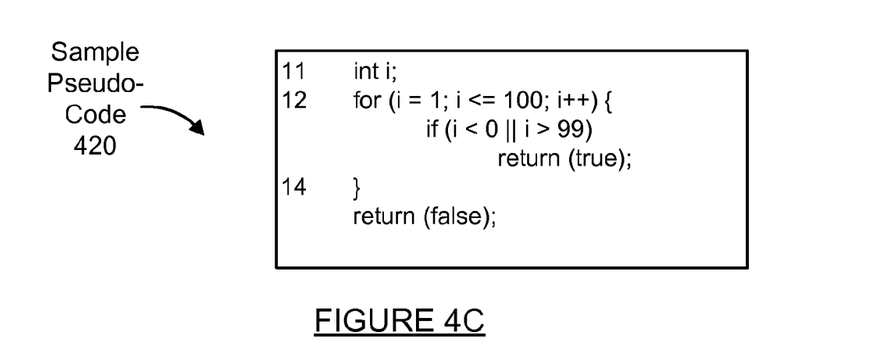

Next, a static program analysis is used a partial evaluation technique to find the second bug in the sample code. Any loop that accesses an array and has a constant number of iterations can be analyzed by creating a slice of the loop that contains the statements that are relevant for the array access. This small slice of code can be augmented with a test for out of bounds access, and code can be generated for the augmented slice (using a JIT compiler) to very quickly determine if any memory is accessed outside the bounds of the loop. This technique is relevant to the code in lines 12-14 of FIG. 4A, where there is a write buffer access on line 13. The slice of this loop are lines 12 and 14, and the execution of the augmented slice would return a true value on overflow and false otherwise, finding the second bug in the program. Pseudo-code for the augmented slice is shown in FIG. 4C.

Figure 4D:
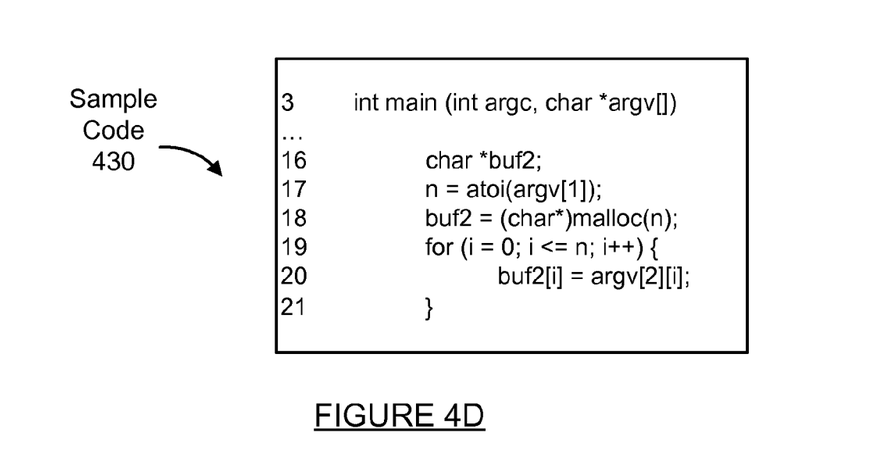

Thereafter, a static program analysis is used to perform a symbolic analysis using affine constraints. Array accesses that are based on indexes that are non-constant require a more complex technique to analyze them. The slice for the array access at line 20 is shown in FIG. 4D. In symbolic analysis, linear constraints are used to determine properties of an array. In the example slice, index variable i needs to be within the range of 0 and n−1, i.e., $0<=i<=(n-1)$. And the index variable is within the range $0<=i<=n$. A linear constraint solver detects that one of the indexes is out of bounds (when i becomes n), therefore finding the third buffer overflow in the program.

Figure 5:
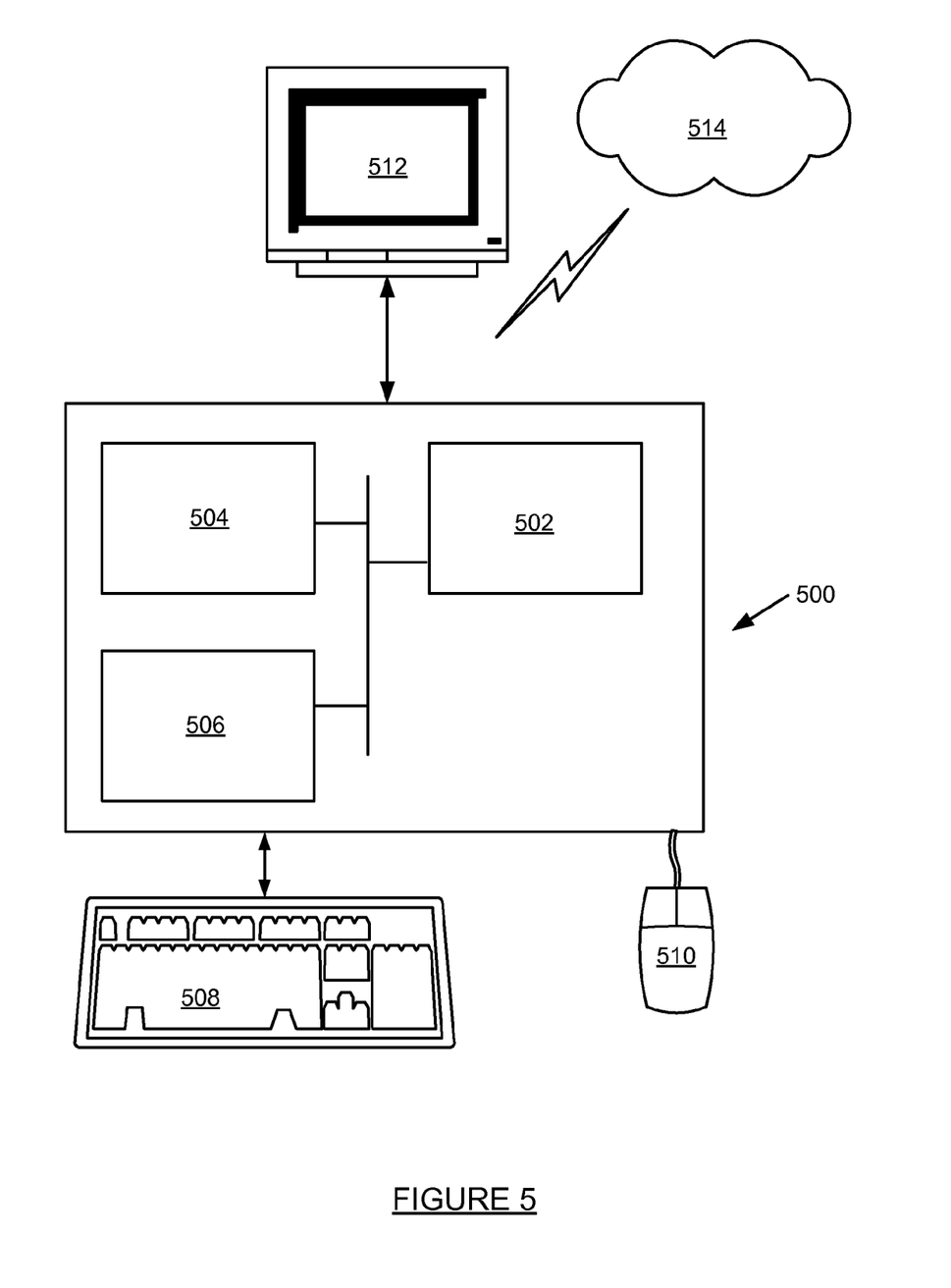
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a LAN or a WAN (e.g., the Internet) (514) via a network interface connection. Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., results repository, static analysis engine, static program analyses, statement modifier, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for analyzing a plurality of potential bug statements in source code, comprising:
    obtaining a plurality of static program analyses;
    recursively reducing the plurality of potential bug statements in the source code by:
        selecting a static program analysis for each recursion from the plurality of static program analyses in order from least time consuming to most time consuming;
        evaluating the plurality of potential bug statements using the static program analysis of the plurality of static program analyses to determine a subgroup of bug free statements of the plurality of potential bug statements in each recursion, wherein evaluating the plurality of potential bug statements comprises:
            evaluating a first potential bug statement using a first static program analysis of the plurality of static program analyses to determine whether the first potential bug statement is a bug free statement, wherein if it cannot be determined whether the first potential bug statement is a bug free statement and subsequent to evaluating the first potential bug statement using the first static program analysis, concurrently:
                evaluating the first potential bug statement using a second static program analysis of the plurality of static program analyses to determine whether the first potential bug statement is a bug free statement; and
                evaluating a second potential bug statement using the first static program analysis to determine whether the second potential bug statement is a bug free statement,
            wherein the first static program analysis is less time consuming than the second static program analysis; and
        removing the subgroup of the bug free statements from the plurality of potential bug statements to reduce the plurality of potential bug statements in each recursion;
    thereby filtering at least one subgroup of bug free statements out of the plurality of potential bug statements in the source code.

2. The method of claim 1, further comprising modifying at least one potential bug statement of a remaining plurality of potential bug statements.

3. The method of claim 1, wherein the plurality of static program analyses comprises at least two static program analyses.

4. The method of claim 1, further comprising:
    evaluating the plurality of potential bug statements using the static program analysis of the plurality of static program analyses to determine a subgroup of real bug statements of the plurality of potential bug statements in each recursion;
    removing the subgroup of the real bug statements from the plurality of potential bug statements to reduce the plurality of potential bug statements in each recursion; and
    subsequent to recursively reducing the plurality of potential bug statements, modifying at least one real bug statement of the subgroup of real bug statements.

5. The method of claim 1, wherein a time consumption of the static program analysis is determined based on a runtime complexity estimate.

6. The method of claim 5, wherein the runtime complexity estimate is one from a group consisting of linear, exponential, and logarithmic.

7. A system for analyzing a plurality of potential bug statements, comprising:
    a computer processor;
    a results repository comprising:
        a plurality of potential bug statements;
    a static analysis engine executing on the computer processor and comprising functionality to recursively:
        select a static program analysis for each recursion from a plurality of static program analyses in order from least time consuming to most time consuming;
        evaluate the plurality of potential bug statements using the static program analysis of the plurality of static program analyses to determine a subgroup of bug free statements of the plurality of potential bug statements in each recursion, wherein evaluating the plurality of potential bug statements comprises:
            evaluating a first potential bug statement using a first static program analysis of the plurality of static program analyses to determine whether the first potential bug statement is a bug free statement, wherein if it cannot be determined whether the first potential bug statement is a bug free statement and subsequent to evaluating the first potential bug statement using the first static program analysis, concurrently:
                evaluating the first potential bug statement using a second static program analysis of the plurality of static program analyses to determine whether the first potential bug statement is a bug free statement; and evaluating a second potential bug statement using the first static program analysis to determine whether the second potential bug statement is a bug free statement, wherein the first static program analysis is less time consuming than the second static program analysis; and remove the subgroup of the bug free statements from the plurality of potential bug statements to reduce the plurality of potential bug statements in each recursion; and a statement modifier executing on the computer processor and comprising functionality to:

modify at least one potential bug statement of the plurality of potential bug statements.

8. The system of claim 7, wherein the plurality of static program analyses comprises at least two static program analyses.

9. The system of claim 7, wherein the static analysis engine further comprises functionality to recursively:

evaluate the plurality of potential bug statements using the static program analysis of the plurality of static program analyses to determine a subgroup of real bug statements of the plurality of potential bug statements in each recursion; and remove the subgroup of the real bug statements from the plurality of potential bug statements to reduce the plurality of potential bug statements in each recursion;

wherein the statement modifier further comprises functionality to:

modify at least one real bug statement of the subgroup of real bug statements.

10. The system of claim 7, wherein the static analysis engine further comprises functionality to:

determine a time consumption of the static program analysis based on a runtime complexity estimate of the static program analysis.

11. The system of claim 10, wherein the runtime complexity estimate is one from a group consisting of: linear; exponential; and logarithmic.

12. A non-transitory computer readable medium comprising instructions for analyzing a plurality of potential bug statements, the instructions comprising functionality for:

obtaining a plurality of static program analyses;

recursively reducing the plurality of potential bug statements in the source code by:

selecting a static program analysis for each recursion from the plurality of static program analyses in order from least time consuming to most time consuming;

evaluating the plurality of potential bug statements using the static program analysis of the plurality of static program analyses to determine a subgroup of bug free statements of the plurality of potential bug statements in each recursion, wherein evaluating the plurality of potential bug statements comprises:

evaluating a first potential bug statement using a first static program analysis of the plurality of static program analyses to determine whether the first potential bug statement is a bug free statement, wherein if it cannot be determined whether the first potential bug statement is a bug free statement and subsequent to evaluating the first potential bug statement using the first static program analysis, concurrently:

evaluating the first potential bug statement using a second static program analysis of the plurality of static program analyses to determine whether the first potential bug statement is a bug free statement; and evaluating a second potential bug statement using the first static program analysis to determine whether the second potential bug statement is a bug free statement, wherein the first static program analysis is less time consuming than the second static program analysis; and removing the subgroup of the bug free statements from the plurality of potential bug statements to reduce the plurality of potential bug statements in each recursion;

thereby filtering at least one subgroup of bug free statements out of the plurality of potential bug statements in the source code.

13. The non-transitory computer readable medium of claim 12, wherein the plurality of static program analyses comprises at least two static program analyses.

14. The non-transitory computer readable medium of claim 12, wherein the instructions further comprising functionality for:

evaluating the plurality of potential bug statements using the static program analysis of the plurality of static program analyses to determine a subgroup of real bug statements of the plurality of potential bug statements in each recursion;

removing the subgroup of the real bug statements from the plurality of potential bug statements to reduce the plurality of potential bug statements in each recursion; and subsequent to recursively reducing the plurality of potential bug statements, modifying at least one real bug statement of the subgroup of real bug statements.

15. The non-transitory computer readable medium of claim 12, wherein the instructions further comprising functionality for:

evaluating a first potential bug statement using a first static program analysis of the plurality of static program analyses to determine whether the first potential bug statement is a bug free statement, wherein it cannot be determined whether the first potential bug statement is a bug free statement; and subsequent to evaluating the first potential bug statement using the first static program analysis, concurrently:

evaluating the first potential bug statement using a second static program analysis of the plurality of static program analyses to determine whether the first potential bug statement is a bug free statement; and evaluating a second potential bug statement using the first static program analysis to determine whether the second potential bug statement is a big free statement, wherein the first static program analysis is less time consuming than the second static program analysis.

16. The non-transitory computer readable medium of claim 12, wherein a time consumption of the static program analysis is determined based on a runtime complexity estimate.

17. The non-transitory computer readable medium of claim 16, wherein the runtime complexity estimate is one from a group consisting of linear, exponential, and logarithmic.

* * * * *

UNITED STATES PATENT AND TRADEMARK OFFICE
CERTIFICATE OF CORRECTION

| | | |
|---|---|---|
| PATENT NO. | : 8,527,965 B2 | Page 1 of 1 |
| APPLICATION NO. | : 12/102796 | |
| DATED | : September 3, 2013 | |
| INVENTOR(S) | : Cristina N. Cifuentes et al. | |

It is certified that error appears in the above-identified patent and that said Letters Patent is hereby corrected as shown below:

In the Claims

Column 12, claim 15, line 56, "second potential bug statement is a big free statement,"

should read:

-- second potential bug statement is a bug free statement, --

Signed and Sealed this
Eighth Day of July, 2014

Michelle K. Lee
*Deputy Director of the United States Patent and Trademark Office*